US006503551B1

(12) United States Patent
Hester

(10) Patent No.: US 6,503,551 B1
(45) Date of Patent: Jan. 7, 2003

(54) METHOD FOR ROASTING FOWL

(75) Inventor: Kevin R. Hester, Lake Charles, LA (US)

(73) Assignee: Cajun Chickcan, L.L.C., Lake Charles, LA (US)

( * ) Notice: Subject to any disclaimer, the term of this patent is extended or adjusted under 35 U.S.C. 154(b) by 0 days.

(21) Appl. No.: 10/164,160

(22) Filed: Jun. 7, 2002

Related U.S. Application Data

(62) Division of application No. 09/885,327, filed on Jun. 20, 2001, now Pat. No. 6,460,452.

(51) Int. Cl.[7] .................................................. A23L 1/00
(52) U.S. Cl. ...................................... 426/523; 426/644
(58) Field of Search ................................ 426/523, 520, 426/509, 644; 99/345, 347

(56) References Cited

U.S. PATENT DOCUMENTS

| 4,718,402 A | 1/1988 | Fordyce |
| 5,106,642 A | 4/1992 | Ciofalo |
| 5,690,980 A | * 11/1997 | Fraga .......................... 426/523 |
| 6,119,585 A | 9/2000 | Guidry |
| 6,216,586 B1 | 4/2001 | Burgin |

OTHER PUBLICATIONS

Marlin Steel Wire Products, Website, May 31, 2001, Baltimore, MD.

* cited by examiner

*Primary Examiner*—George C. Yeung
(74) *Attorney, Agent, or Firm*—William W. Stagg

(57) ABSTRACT

A method for roasting a fowl utilizing a wire frame for supporting a beverage can in an upright position, the can having at least one top opening and containing a desired flavored beverage. The beverage can is fitted into the frame, opened, and inserted into the central cavity of a fowl that has been cleaned and seasoned as desired. The frame holds the beverage can and the whole fowl in a substantially vertical position for roasting. The frame may be placed over a pan to collect the juices from the fowl as it is roasted. The apparatus is employed by placing the frame, upon which is mounted the beverage can with the desired liquid and the fowl to be roasted, into a heat source. The heat source may be an oven, a roaster, or the surface of a barbecue grill. As the beverage heats during roasting the flavor of the beverage is imparted to the fowl.

20 Claims, 5 Drawing Sheets

METHOD FOR ROASTING FOWL

This is a division of application of Ser. No. 09/885,327 entitled "Fowl Roasting Apparatus" filed Jun. 20, 2001, now U.S. Pat. No. 6,460,452.

BACKGROUND AND FIELD OF INVENTION

The present invention generally relates to the field of cooking utensils and, more particularly, relates to an apparatus for holding, in combination, a beverage can containing a desired flavored beverage and a selected fowl in order to facilitate the roasting and flavoring of the fowl with the vapors from beverage as the selected fowl is cooked.

DETAILED DESCRIPTION OF EMBODIMENTS

Figure 1:
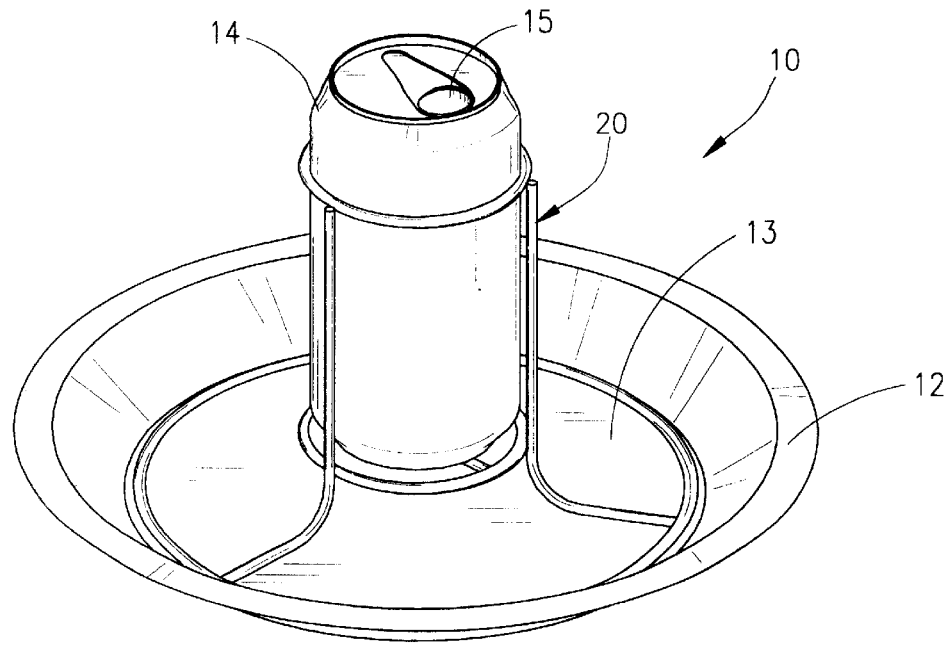
FIG. 1 is a perspective view of applicant's roasting assembly.
Figure 2:
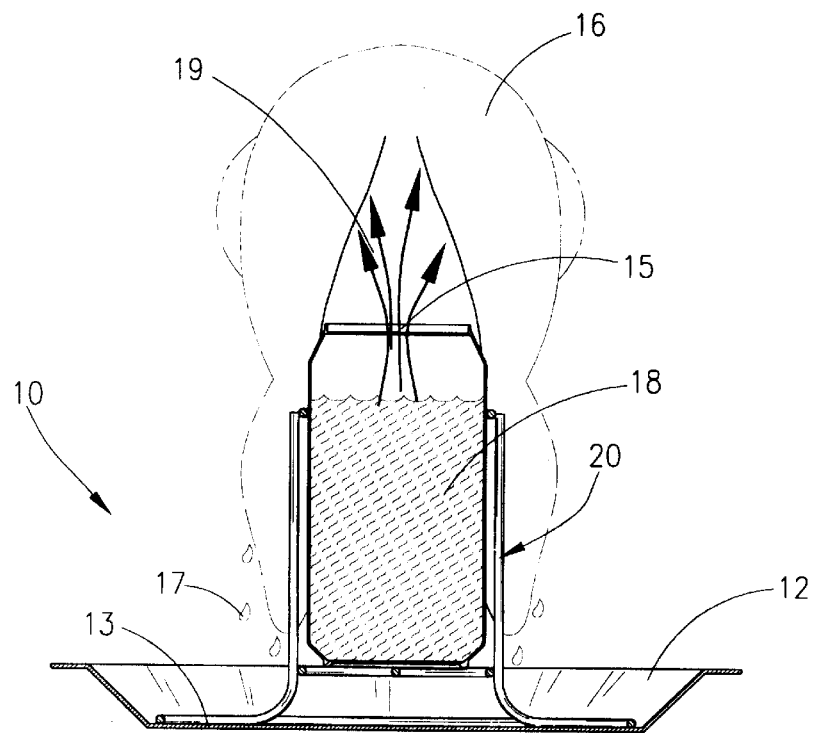
FIG. 2 is a cross-section elevation view of the roasting assembly of FIG. 1.

Referring now to the drawings, and more particularly to FIGS. 1 and 2, there is shown an embodiment of applicant's roaster assembly 10. The assembly 10 is comprised of a can-fowl support frame 20, a substantially cylindrical beverage can 14 and a collecting pan 12. The can-fowl support frame 20 is comprised of a wire frame configured for receiving and holding in place the beverage can 14 in an upright position. The frame 20 is configured to rest on the bottom 13 of a pan 12 with the can 14 in its upright position. The pan 12 is utilized to collect roasting juices during roasting and may be made of metals, such as stainless steel or aluminum, glass, polymers, or other suitable heat resistant material. A disposable pans such as those made from aluminum would be suitable as the pan 12 of applicant's invention.

As can be seen in FIG. 2, there is shown an elevational cross sectional view of applicant's roaster assembly 10 in use as means for roasting a fowl 16 in a vertical position. The assembly 10 is utilized after first selecting a whole fowl 16 for roasting. The fowl 16, whether chicken, duck, turkey or other roasting bird, having been cleaned and washed to leave an interior cavity with opening at the head and tail end of the fowl, is seasoned as desired. Next, a beverage can 14 having top opening 15 containing a desired beverage for flavoring the fowl is placed within the frame 20 so that the can 14 is supported by the frame 20 in an upright position. The whole fowl 16 is then placed over the frame 20 and can 14 by means of inserting the frame 20 and can 14 into the interior cavity of the fowl 16 so as to support the fowl on the frame 20 with the open can 14 extending at least partially into the interior cavity of fowl 16. The frame 20 along with the can 14 and supported fowl 16 is then placed on the bottom 13 of pan 12. The base 13 of the pan 12 has a diameter sufficiently wider than the width of the support frame 20 and fowl 16 to facilitate the collection of roasting juices in pan 12 during roasting.

The roasting assembly 10, comprised of the pan 12, the frame 20 and can 14, along with the supported fowl 16, is then placed in a roaster, oven, or on the surface of a barbecue grill heating and correspondingly roasting the fowl. As the temperature of the assembly 10 rises during heating, the beverage liquid contained in the can 14 will begin to vaporize as indicated by arrows 19 to permeate the fowl with the vapors of the desired beverage as a flavoring as the fowl 16 as it is roasted. Juices 17 from the roasting fowl 16 are collected on the bottom 13 of the pan 12 during the roasting process. The can 14 may contain any desired beverage such as beer, variously flavored soft drinks, or fruit based beverages such as tomato juice, orange juice, apple juice, grape juice or the like. Other spices or seasonings may be added to the beverage in can 14 if desired.

In applicant's assembly 10, juices 17 from the roasted fowl 16 are collected in the pan 12 to avoid mess during roasting and for ease of clean up of the cooking. The pan 12 is of sufficient dimensions to extend beyond the width of the fowl 16 when the fowl 16 is mounted on the frame 20. The juices 17 collected in pan 12 may be discarded or otherwise used as basting liquids or other cooking purposes. After the fowl 16 is cooked as desired, it can be pulled from the frame 20 and set aside for cooling. The pan 12, if disposable, and the can 14 may be discarded leaving only the frame 12 to be cleaned and reused. The frame 20 may be comprised of any heat resistant material, whether metal, glass or polymer materials, though it is suggested that wire comprised of kitchen grade stainless steel or aluminum be utilized to form the frame 20.

Figure 3:
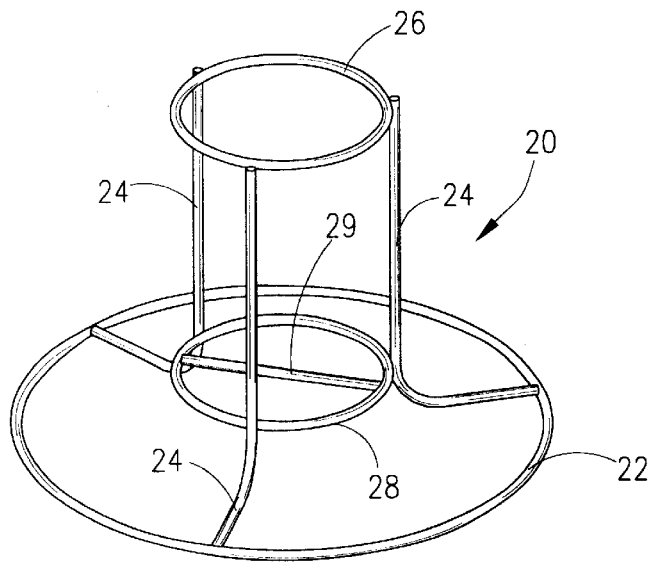
FIG. 3 is a perspective view of applicant's can-fowl support frame 20.
Figure 4:
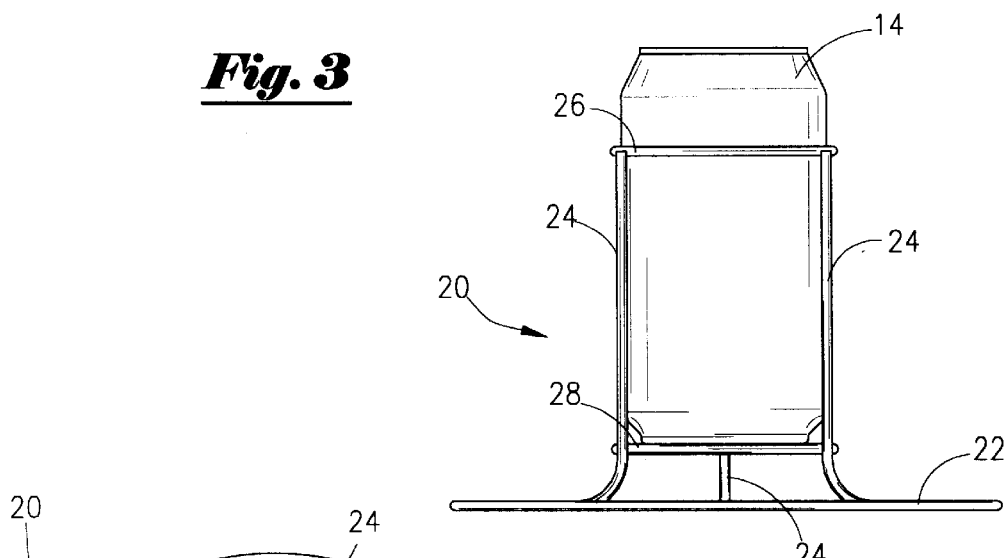
FIG. 4 is an elevation view of the can-fowl support frame 20 depicted in FIG. 3.

FIG. 3 shows a perspective view of the frame 20 of applicant's assembly 10. The frame 20 is comprised of a frame base ring 22 of a desired diameter and an upper frame support ring 26. The upper support ring 26 is of a diameter sufficient to encircle a desired sized beverage can 14 when the can 14 is insert within the ring. A plurality of L-shaped struts 24 are arrayed uniformly around the center of the base ring 22 and mounted to the base ring 22 so as provide a plurality of supporting members extending vertically from the base ring 22. The upper ring 26 is mounted to the vertical extending portion of the L-shaped struts 24 so as to support the ring 26 at a desired fixed location above the base ring 22. A can support ring 28 having support bar 29 is mounted to the struts 24 at a desired point between the base ring 22 and the upper ring 26, the support ring 28 being concentric with and parallel to the base ring 22 and the upper ring 28. As shown in FIG. 4, a beverage can 14 may then be inserted within upper ring 26 and supported in an upright position by frame 20 by means of the can support ring 28 and the struts 24.

Figure 5:
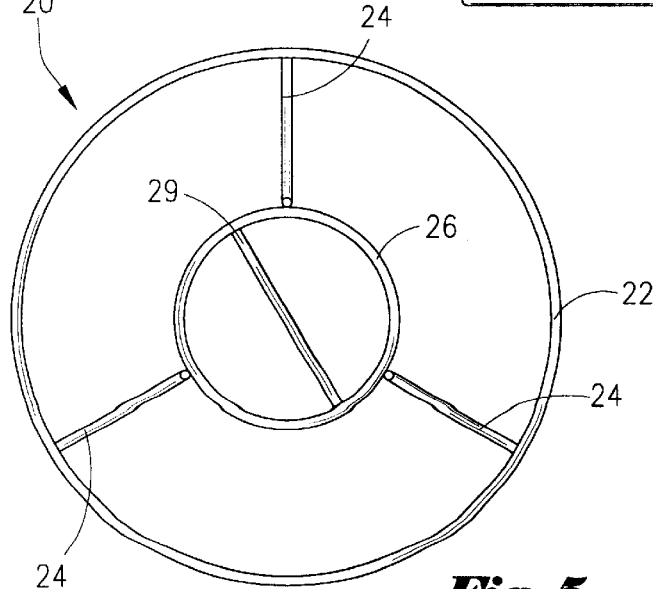
FIG. 5 is a top view of the can-fowl support frame 20 depicted in FIG. 3.

FIG. 5 is a plan view of the frame 20 shown in FIG. 3. This view shows the concentric orientation of the support ring 28 with respect to the base ring 22 and the upper ring 26 as well as the uniform spacing of the L-shaped struts 24. The support arm 29 is shown fixed across the support ring 28 to aid in the support the beverage can 14.

Figure 6:
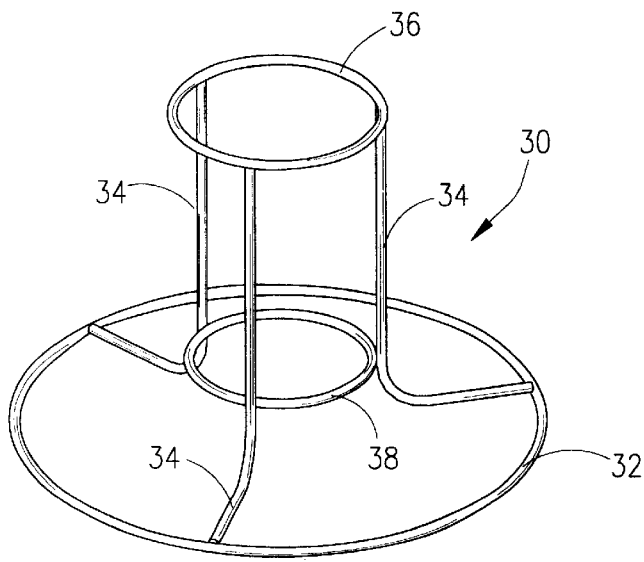
FIG. 6 is a perspective view of applicant's can-fowl support frame 30.
Figure 7:
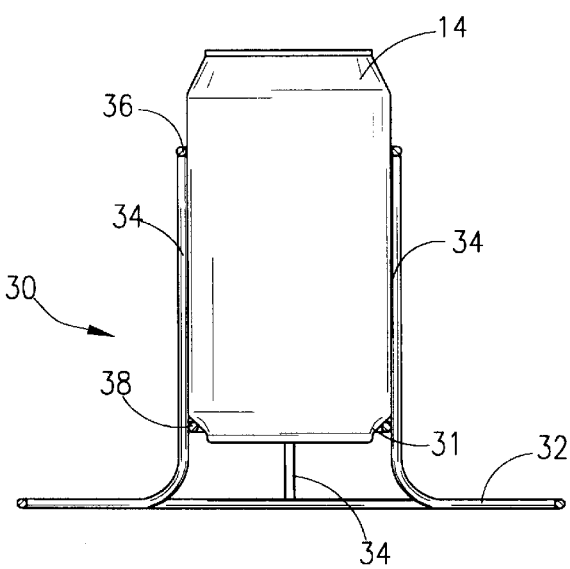
FIG. 7 is an elevation view of the can-fowl support frame 30 depicted in FIG. 6.
Figure 8:
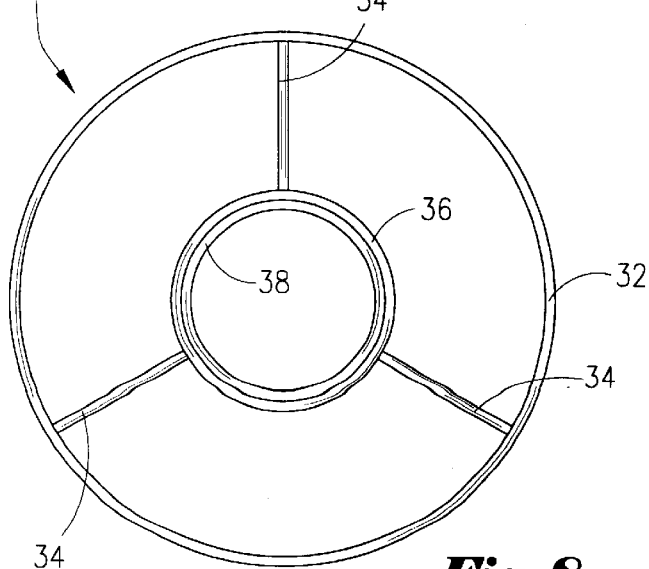
FIG. 8 is a top view of the can-fowl support frame 30 depicted in FIG. 6.

Another embodiment of applicant's invention is that illustrated in FIGS. 6, 7 and 8. In FIG. 6 there is shown the embodiment of a can-fowl support frame 30. The frame 30 is comprised of a base support ring 32, an upper frame support ring 36, and a can support ring 38. The frame support ring 36 is connected to the base support ring 32 by means of a plurality of L-shaped, vertically extending, struts 34. In the embodiment depicted in FIG. 6, the struts 34 are arrayed in a desired angular relationship around the inside of the base ring 32 and are attached to the frame support ring 36 in a manner to position the frame support ring 36 above the base ring 32 to form the can-fowl support frame 30. The frame support ring 36 is of a diameter sufficient to receive a beverage can 14 when the can 14 is insert in an upright position through the support ring 36.

As shown in FIG. 6, and more particularly in FIG. 7, the can support ring 38 is fixed at its outer edge between the vertically extending support struts 34 at a desired position for supporting a beverage can 14 in an upright position on the frame 30 within the struts 34. In this embodiment, the can support ring 38 is of a diameter sufficient to receive and support along its periphery the flanged base of a standard aluminum beverage can. As can be seen in FIG. 8, a top view of can-fowl support frame 30, the can support ring 38 has a narrower diameter than the upper can ring 36. As shown in FIG. 7, the narrower diameter of the can support ring 38 allows the flanged based 31 of a standard beverage, typically narrower than the overall diameter of the can 14 itself, to be received and supported within the support ring 38.

Figure 9:
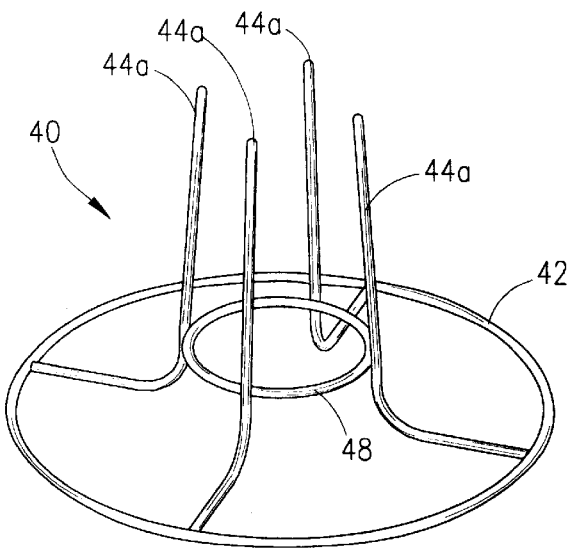
FIG. 9 is a perspective view of applicant's can-fowl support frame 40.
Figure 10:
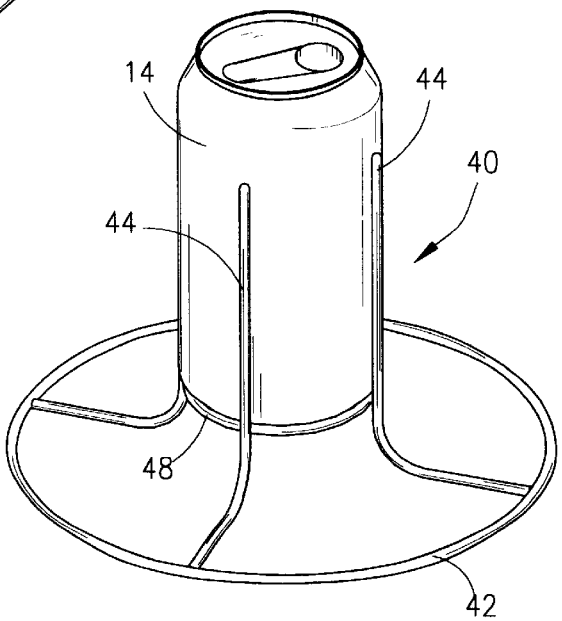
FIG. 10 is an elevation view of the can-fowl support frame 40 depicted in FIG. 9
Figure 11:
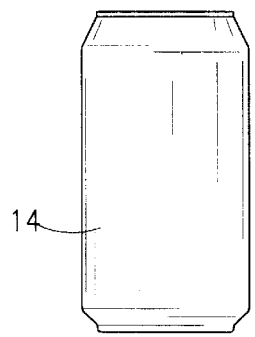
FIG. 11 is an elevation view of the can-fowl support frame 40 depicted in FIG. 9.
Figure 11:
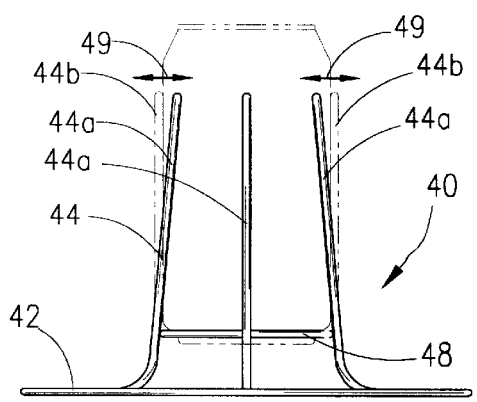

Can-fowl support frame 40, still another embodiment of applicant's invention, is shown in FIGS. 9, 10 and 11. Frame 40 is comprised of a base ring 42, a plurality of L-shaped, vertically extending, inwardly flexed, struts 44 and a can support ring 48. The can support ring 48 is positioned at a desired point along the struts 44 at a point concentric with and above the base ring 42. As can be seen in FIGS. 9 and 10, and more particularly in FIG. 11, the struts 44 flex from an initial inward position 44a to an outward position 44b as indicated by arrows 49. This flexibility accommodates the insertion of a beverage can 14 between the struts 44 so that the can 14 may be supported on can support ring 48. In this embodiment, as in the embodiment depicted in FIGS. 6, 7 and 8, the can support ring 48 has a diameter slightly narrower than the overall diameter of the beverage can 14, but sufficient to receive and support the flanged base 31 of a standard aluminum beverage can 14.

Figure 12:
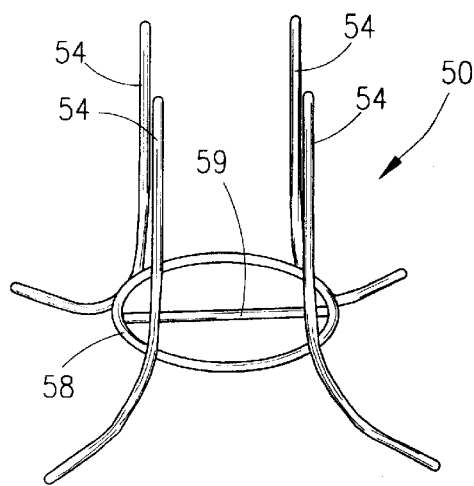
FIG. 12 is a perspective view of applicant's can-fowl support frame 50.
Figure 13:
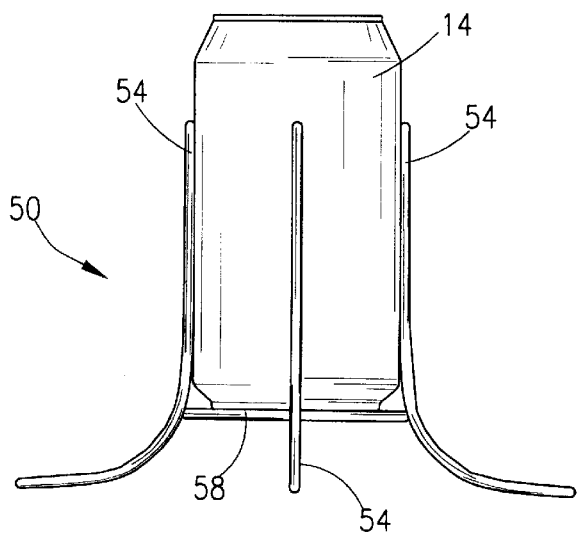
FIG. 13 is an elevation view of the can-fowl support frame 50 depicted in FIG. 12.
Figure 14:
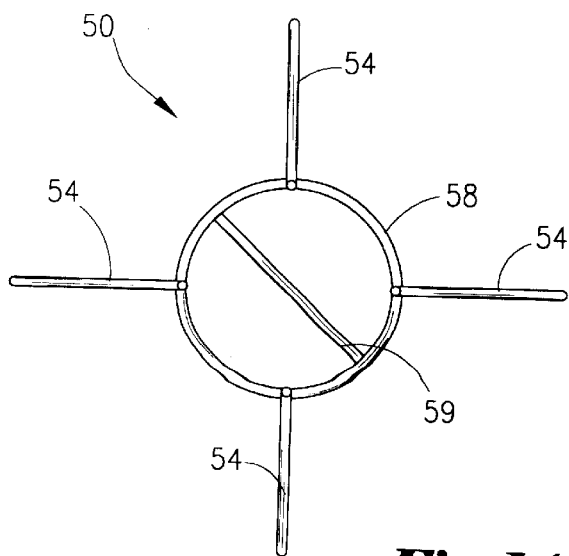
FIG. 14 is a top view of the can-fowl support frame 50 depicted in FIG. 12.

Still another embodiment of applicant's invention is shown in FIGS. 12, 13 and 14. FIG. 12 shows a perspective view of can-fowl support frame 50. The frame 50 is comprised of a plurality of L-shaped, vertically extending, struts 54 mounted uniformly around the periphery of a can support ring 58. The horizontal leg of the L-shaped struts 54 forms a base for supporting the frame 50. The can support ring 58 is of a diameter only slightly larger that the diameter of a selected beverage can 14 for which it is intended to support. As shown in FIG. 13, the beverage can 14 is inserted in an upright position between the vertical legs of the support struts 54 and supported on the support ring 58 in its upright position. FIG. 14, a plan view of the frame 50 shows a support bar 59 extending diagonally across the support ring 58 to support the can 14 and reinforce the frame 50.

The above described can-fowl support frames, designated 30, 40 and 50, may be substituted for the can-fowl support frame 20 described above and may used in the roaster assembly 10 in conjunction with a can 14 and a pan 12 in the manner as described as described here and depicted in FIGS. 1 and 2. The frames 20, 30, 40 and 50 assembly in each of these embodiments may be constructed of any heat resistant non-toxic material, whether metal or polymer, though it is thought that a food grade stainless steel or aluminum wire would be the preferred material.

The frames 20, 30, 40 and 50 of applicant's invention are configured to support and hold a beverage can in an upright position for internally flavoring the fowl to be roasted and are easily cleaned for reuse. Because beverage cans are produced in a variety of sizes, standard sizes such as 12 oz., 16 oz., or 20 oz. cans being commonly found, the frames 20, 30, 40 and 50 may also be configured in a variety of dimensions to support a can 14 of a desired size. Similarly, the frames 20, 30, 40 and 50 may be configured in size and dimension for supporting fowl of various sizes and weights. It is understood that frames 20, 30, 40 and 50 configured in size for roasting a turkey may necessarily be larger than those that might be configured in size for roasting a chicken.

It is also understood by applicant that the assembly 10 may be modified to eliminate the pan 12 and that a fowl 16 may be mounted on any of the frames 20, 30, 40, 50 in combination with a desired beverage can 14 for roasting without employing a pan 12 to collect the juices 17 from the roasting fowl 16. When the pan 12 is not so employed, it is understood that the juices 17 produced by the roasting fowl 16 when mounted frames 20, 30, 40, 50, in combination with a desired beverage can 14, will drop from the fowl 16 and not be collected. Consequently, a heating means having an independent collection means for the juices 17 or an outside barbecue grill must be employed to avoid the mess of cleanup brought on by the dropping juices.

It is thought that the fowl roaster apparatus and method of the present invention and many of its attendant advantages will be understood from the foregoing description. It is also thought, and it will be apparent, that various changes may be make in the form, construction and arrangement of the parts thereof without departing from the spirit and scope of the invention or sacrificing all of its material advantages.

I claim:

1. A method for roasting fowl comprising:
   (a) providing a support frame for a beverage can, said frame having a base, a can support ring and a plurality of struts mounted to said base and said can support ring, said struts extending vertically upward from said can support ring around the periphery of said can support ring;
   (b) cleaning and seasoning a whole fowl to be roasted, said cleaning to include leaving a central cavity within said fowl;
   (c) selecting a beverage can containing a predetermined liquid beverage;
   (d) creating an opening in the top of said selected beverage can;
   (e) inserting said selected beverage can between said struts onto said can support ring and thereby supporting said beverage can upon said can support ring within said struts;
   (f) inserting said frame and said supported beverage can into said cavity of said fowl and thereby supporting said fowl vertically on said frame with said beverage can at least partially inserted within said cavity of said fowl; and (g) applying heat to said frame, said beverage can and said fowl, in combination, so as to roast said fowl and simultaneously vaporize said liquid beverage contained in said beverage can for permeating the fowl with the vapors of the predetermined beverage as a flavoring.

2. The method as recited in claim 1 wherein, said step of providing a support frame includes providing a support frame wherein said base of said frame is a ring.

3. The method as recited in claim 2 wherein, said step of providing a support frame includes providing a support frame wherein each of said struts is L-shaped.

4. The method as recited in claim 2 wherein, said step of providing a support frame includes providing a support frame wherein said can support ring has a can support bar extending across said can support ring.

5. The method as recited in claim 3 wherein, said step of providing a support frame includes providing a support frame wherein said can support ring has a can support bar extending across said can support ring.

6. The method as recited in claim 5 wherein the step of providing a frame includes providing a wire frame.

7. The method as recited in claim 6 wherein said wire is stainless steel.

8. The method as recited in claim 6 wherein said wire is aluminum.

9. The method as recited in claim 6 further comprising the additional steps of:
  (a) providing a pan for holding liquids; and
  (b) placing said frame, beverage can and fowl onto said pan prior to said step of applying heat.

10. The method as recited in claim 9 wherein in the step of providing a pan, said pan is a disposable pan.

11. The method as recited in claim 3 wherein the step of selecting a beverage can includes selecting a substantially cylindrical beverage can having a top, a bottom, cylindrical sidewalls, the diameter of said cylindrical sidewalls being wider than the diameter of said can bottom, and a flanged base area extending between said can bottom and said can sidewalls.

12. The method as recited in claim 11 wherein in the step of inserting said selected beverage can between said struts onto said can support ring and thereby supporting said beverage can upon said can support ring within said struts includes inserting the base of said beverage can into said support ring and supporting said can along the periphery of said flanged base area of said beverage can.

13. The method as recited in claim 12 wherein the step of providing a frame includes providing a wire frame.

14. The method as recited in claim 13 further comprising the additional steps of:
  (c) providing a pan for holding liquids; and
  (d) placing said frame, beverage can and fowl, in combination, onto said pan prior to said step of applying heat.

15. The method as recited in claim 14 wherein in the step of providing a pan, said pan is a disposable pan.

16. The method as recited in claim 15 wherein said wire is stainless steel.

17. The method as recited in claim 16 wherein said wire is aluminum.

18. A method for roasting fowl comprising:
  (a) providing a wire support frame for a beverage can, said frame having a base ring, a can support ring and a plurality of L-shaped struts mounted to said base ring and said can support ring, said struts extending vertically upward from said can support ring around the periphery of said can support ring to position said support ring concentrically with said base ring;
  (b) cleaning and seasoning a whole fowl to be roasted, said cleaning to include leaving a central cavity within said fowl;
  (c) selecting a beverage can containing a predetermined liquid beverage, said beverage can being substantially cylindrical and having a top, a bottom, cylindrical sidewalls, the diameter of said cylindrical sidewalls being wider than the diameter of said can bottom, and a flanged base area extending between said can bottom and said can sidewalls;
  (d) creating an opening in said top of said selected beverage can;
  (e) inserting said selected beverage can between said struts onto said can support ring and thereby supporting said beverage can upon said can support ring within said struts;
  (f) inserting said supported beverage can with said top opening into said cavity of said fowl and thereby supporting said fowl vertically on said frame with said beverage can at least partially inserted within said cavity of said fowl;
  (g) placing said frame, said beverage can and said fowl, in combination, onto a pan; and
  (h) applying heat to said frame, said beverage can and said fowl, in combination, so as to roast said fowl and simultaneously vaporize said liquid beverage contained in said beverage can for permeating the fowl with the vapors of the predetermined beverage as a flavoring.

19. The method as recited in claim 18 wherein in the step of inserting said selected beverage can between said struts onto said can support ring and thereby supporting said beverage can upon said can support ring within said struts includes inserting the base of said beverage can into said support ring and supporting said can along the periphery of said flanged base area of said beverage can.

20. The method as recited in claim 19 wherein said step of applying heat includes placing said frame, said beverage can and said fowl, in combination, into a heated oven.

* * * * *